(12) United States Patent
Sakthivel et al.

(10) Patent No.: US 12,066,402 B2
(45) Date of Patent: Aug. 20, 2024

(54) SENSOR COIL

(71) Applicant: Baker Hughes Holdings LLC, Houston, TX (US)

(72) Inventors: Navin Sakthivel, Spring, TX (US); Mikhail Anisimov, The Woodlands, TX (US); Joerg Weislogel, Karlsruhe (DE); Martin Berthold Spies, Saarbruecken (DE); Aaron Avagliano, The Woodlands, TX (US); Sandip Maity, Manama (BH); Amir Saeed, Katy, TX (US); Sreedhar Puliyakote, Karlsruhe (DE)

(73) Assignee: Baker Hughes Holdings LLC, Houston, TX (US)

( * ) Notice: Subject to any disclaimer, the term of this patent is extended or adjusted under 35 U.S.C. 154(b) by 359 days.

(21) Appl. No.: 17/577,762

(22) Filed: Jan. 18, 2022

(65) Prior Publication Data
US 2023/0228714 A1 Jul. 20, 2023

(51) Int. Cl.
| | |
|---|---|
| *G01N 27/90* | (2021.01) |
| *B22F 5/12* | (2006.01) |
| *B29C 64/153* | (2017.01) |
| *B33Y 10/00* | (2015.01) |
| *B33Y 80/00* | (2015.01) |
| *G01N 29/04* | (2006.01) |

(52) U.S. Cl.
CPC ........... *G01N 27/9006* (2013.01); *B22F 5/12* (2013.01); *B29C 64/153* (2017.08); *G01N 29/041* (2013.01); *B33Y 10/00* (2014.12); *B33Y 80/00* (2014.12)

(58) Field of Classification Search
None
See application file for complete search history.

(56) References Cited

U.S. PATENT DOCUMENTS

| | | | |
|---|---|---|---|
| 5,503,020 | A | 4/1996 | Mandracchia |
| 2014/0215784 | A1 | 8/2014 | Lhuillier |
| 2016/0176702 | A1* | 6/2016 | Pagani ................. B81B 7/0074 257/419 |
| 2018/0156758 | A1 | 6/2018 | Glass et al. |

OTHER PUBLICATIONS

Huang et al., "Contoured PPM-EMAT Design for Ultrasonic Communication on Metallic Pipe Channels", 2020 IEEE International Conference on Electro Information Technology (EIT), Jul. 2020.

* cited by examiner

*Primary Examiner* — Farhana A Hoque
(74) *Attorney, Agent, or Firm* — Mintz, Levin, Cohn, Ferris, Glovsky and Popeo, P.C.

(57) ABSTRACT

A method of manufacturing is provided. The method can include determining a cross-sectional shape of an object to be inspected using a sensor configured with a sensor coil. The method can also include providing a substrate having a profile matching the cross-sectional shape of the object. The method can further include applying a dielectric material to the substrate in a patter matching a shape of the sensor coil. The method can also include forming a first layer of a first material on the dielectric material by sputtering particles of the first material on the dielectric material in the pattern and forming additional layers of the first material atop the first layer by iteratively depositing the additional layers in the pattern via an additive manufacturing technique. A sensor including a sensor coil formed via the method is also provided.

20 Claims, 5 Drawing Sheets

| Design Parameter | | Unit |
|---|---|---|
| Outer diameter of inductor (Dout) | 2362 | mil |
| No of Layers | 8 | |
| Turns per layer(N) | 3 | |
| Trace width(W) | 5.5 | mil |
| Spacing between traces(S) | 4.5 | mil |
| Temperature(T) | 25 | C |
| Voltage (Oscillation Amplitude)(V) | 400 | V |
| Space between 1st layer and 2nd layer(x12) | 6 | mil |
| Space between 2nd layer and 3rd layer(x23) | 6 | mil |
| Space between 3rd layer and 4th layer(x34) | 6 | mil |
| Space between 4th layer and 5th layer(x45) | 6 | mil |
| Space between 5th layer and 6th layer(x56) | 6 | mil |
| Space between 6th layer and 7th layer(x67) | 6 | mil |
| Space between 7th layer and 8th layer(x78) | 6 | mil |

FIG. 5

SENSOR COIL

TECHNICAL FIELD

The subject matter described herein relates to a sensor coil formed via additive manufacturing techniques.

BACKGROUND

Sensors can be used to detect defects in pipes configured in pipelines. The defects can be present in pipe materials or in welds joining portions of pipe. Sensors can also be used to measure properties or qualities of fluids flowing through pipes. Sensors can include sensor coils configured to sense the defects or fluid properties. It can be advantageous to form a sensor with a mating surface and a sensing coil elements which substantially matches a profile of an object being sensed by the sensor. In this way, a maximal surface area of the sensor is in contact with the object being sensed and the accuracy and sensitivity of the sensor can be increased compared to sensors with non-conformal sensing coils.

DESCRIPTION OF DRAWINGS

These and other features will be more readily understood from the following detailed description taken in conjunction with the accompanying drawings, in which:

FIG. 5 is a table illustrating design parameters of the sensor coil formed by the method of manufacturing described in relation to FIG. 1 according to the subject matter provided herein.

It is noted that the drawings are not necessarily to scale. The drawings are intended to depict only typical aspects of the subject matter disclosed herein, and therefore should not be considered as limiting the scope of the disclosure.

DETAILED DESCRIPTION

Existing sensors for use in detecting defects or monitoring fluids within pipes configured in industrial pipelines may be manufactured using processes which can require long lead times and are not economical for the intended application of the sensor. For example, existing electromagnetic acoustic transceiver (EMAT) coil-based sensors can be used to inspect defects in pipes. Traditional EMAT sensor manufacturing methods can include methods similar to manufacturing methods used for printed circuit boards (PCBs). In such methods, the EMAT sensor can be formed using the PCB methods and conventional dielectric materials, such as an epoxy or epoxy laminate material and copper as a conductive material. These methods can be limited to planar substrate shapes (and thus planar sensor coil shapes), as well as strict design processes and workflows which can increase manufacturing lead times. Thus, existing EMAT sensor manufacturing methods can limit applications including non-planar sensors, increase manufacturing lead times, and reduce economic scalability.

Forming a sensor or sensor coil using additive manufacturing techniques, such as 3D metal printing or laser sintering, can permit sensors of complex shapes to be formed by fusing metal materials into desired dimensions for a large variety of applications. The complex shapes can include curved or irregular geometric features on sensing elements and can be fabricated in their final form without requiring assembly of multiple individual pieces. Additive manufacturing techniques can enable formation of unibody shaped sensors and sensor coils with profile shapes that substantially match a cross-sectional shape of an object being inspected. Additionally, the additive manufacturing techniques can enable formation of a sensor coil in a single manufacturing step, rather than requiring multiple assembly steps. The sensor coil and method of manufacturing described herein can reduce assembly costs associated with welding components together. Also, the design of the sensing elements of the sensor is not constrained by inventory sizes or pre-existing shapes or costs of materials. As a result, non-conventional shapes can be used to overcome electrical, space, or structural integrity design requirements.

Embodiments of sensor and method of manufacturing are discussed herein in regard to use in an oil and gas production environment. However, embodiments of the disclosure can be employed for sensing characteristics of a fluid in any environment without limitation.

Figure 1:
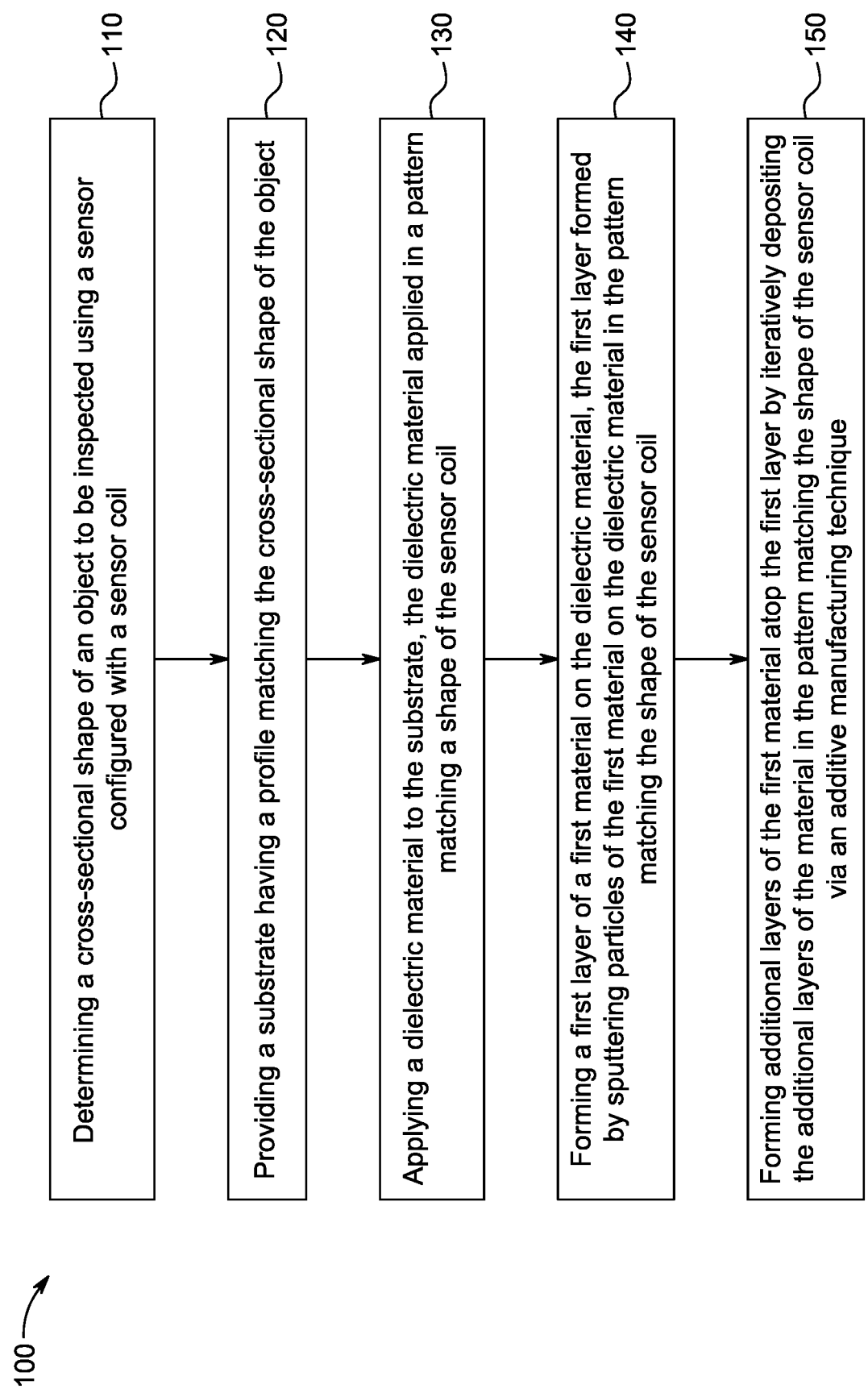
FIG. 1 is a flow chart illustrating an embodiment of a method for manufacturing a sensor coil described according to the subject matter provided herein.

FIG. 1 is a flow chart illustrating an embodiment of a method for manufacturing a sensor coil described according to the subject matter provided herein. As shown in FIG. 1, method 100 includes, at 110, determining a cross-sectional shape of an object to be inspected using a sensor configured with a sensor coil. The object can include a curved, angled, flat or planar, or irregularly-shaped geometric cross-sectional shape. The object to be inspected can be a pipe, or any similar industrial component which can be inspected using a sensor configured to mate with a surface of the object. In some embodiments, the sensor can include an EMAT sensor. In some embodiments, the sensor can include an eddy current sensor.

At 120, a substrate having a profile matching the cross-sectional shape of the object can be provided. The sensor coil can be formed atop the substrate. The profile of the substrate can be selected and provide to match the cross-sectional shape of the object to be inspected. Thus, for a curved object, such as a pipe having curvature corresponding to a 36" diameter, a substrate can be provided that also has a curvature corresponding to a 36" diameter.

At 130, a dielectric material can be applied to the substrate. The dielectric material can be applied in a pattern matching a shape of the sensor coil. In some embodiments, the dielectric material can be applied as a solution that is sprayed onto the substrate. The solution can contain a plurality of dielectric material particles that can be suspended in a carrier fluid that is sprayed onto the substrate. In some embodiments, the dielectric material can include a ceramic material, a polyimide material, a copper material, an epoxy material, or an epoxy laminate material, such as a glass-reinforced epoxy laminate material.

In some embodiments, after the dielectric material is applied to the substrate, the method can further include sintering the dielectric material in an oven or furnace to evaporate or otherwise remove the carrier fluid from the substrate. The sintering can be performed at a pressure and a temperature selected based on the particular dielectric material that is used and/or the carrier fluid that is used to apply the dielectric material.

The dielectric material can be applied in a variety of non-limiting patterns configured to correspond to a shape of the sensor coil of the sensor. For example, the pattern can include a spiral shape of concentrically arranged features, a cross-shaped pattern of features, an elliptically-shaped pattern of features, or a matrix-shaped pattern of features. The features can correspond to traces or tracks of dielectric and conductive material that are formed atop the substrate. In some embodiments, the dielectric material can be applied in a plurality of layers. The plurality of layers can have a thickness that is between 2 microns and 3 microns.

At 140, a first layer of a first material can be formed on the dielectric material. The first layer can be formed by sputtering particles of the first material on the dielectric material in the pattern matching the shape of the sensor coil described above. The first material can be a conductive material, such as silver. In some embodiments, the conductive material can include copper. The use of sputtering to apply the first layer of the conductive material can be advantageous to form a base layer that is sufficiently adhered to the dielectric material so as to reduce the likelihood of delamination of the first layer or subsequent layers of conductive materials that will be applied to the dielectric material. The first layer of conductive material can have a thickness between 3 microns and 4 microns.

At 150, additional layers of the conductive material can be formed atop the first layer of the conductive material by iteratively depositing the additional layers of the conductive material in the pattern matching the shape of the sensor coil. The additional layers of the conductive material can be formed using an additive manufacturing technique. For example, a feedstock of conductive wire or a powder of conductive material can be provided via an additive manufacturing system configured to deposit the conductive material via additive manufacturing techniques. The additive manufacturing techniques can include direct laser melting, direct metal laser melting, laser chemical vapor deposition, or laser physical vapor deposition. The thickness of the additional layers can be between 3 microns and 4 microns. A non-limiting number of additional layers of the conductive material can be deposited to form the sensor coil to a desired thickness. For example, in some embodiments, 1-3, 2-4, 3-5, 4-6, 5-7, 6-8, 7-9, 8-10, or 9-11 additional layers of conductive material can be deposited.

Figure 2:
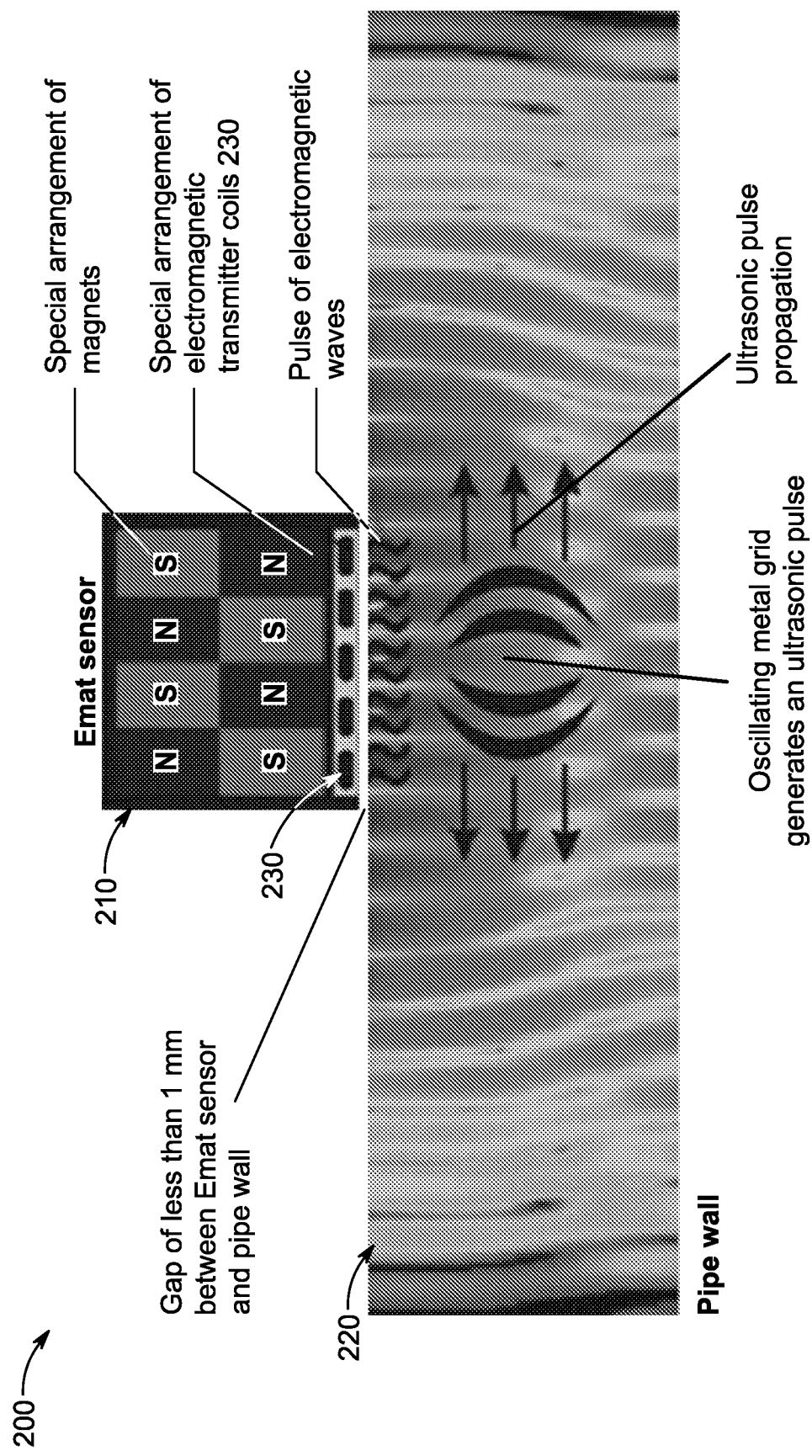
FIG. 2 is a diagram illustrating an embodiment of a sensor including a sensor coil formed by the method of manufacturing described in relation to FIG. 1 according to the subject matter provided herein.

FIG. 2 is a diagram illustrating an embodiment 200 of a sensor 210 including a sensor coil 230 formed by the method of manufacturing described in relation to FIG. 1 according to the subject matter provided herein. As shown in FIG. 2, the sensor 210 can include an EMAT sensor that can be affixed to a pipe wall 220. The EMAT sensor 210 can include a sensor coil 220 that can be formed as described in relation to FIG. 1 herein. The EMAT sensor 210 can generate electromagnetic waves which can enter the pipe wall 220 and cause propagation of an ultrasonic pulse, which can be detected via the sensor coil 230.

Figure 3:
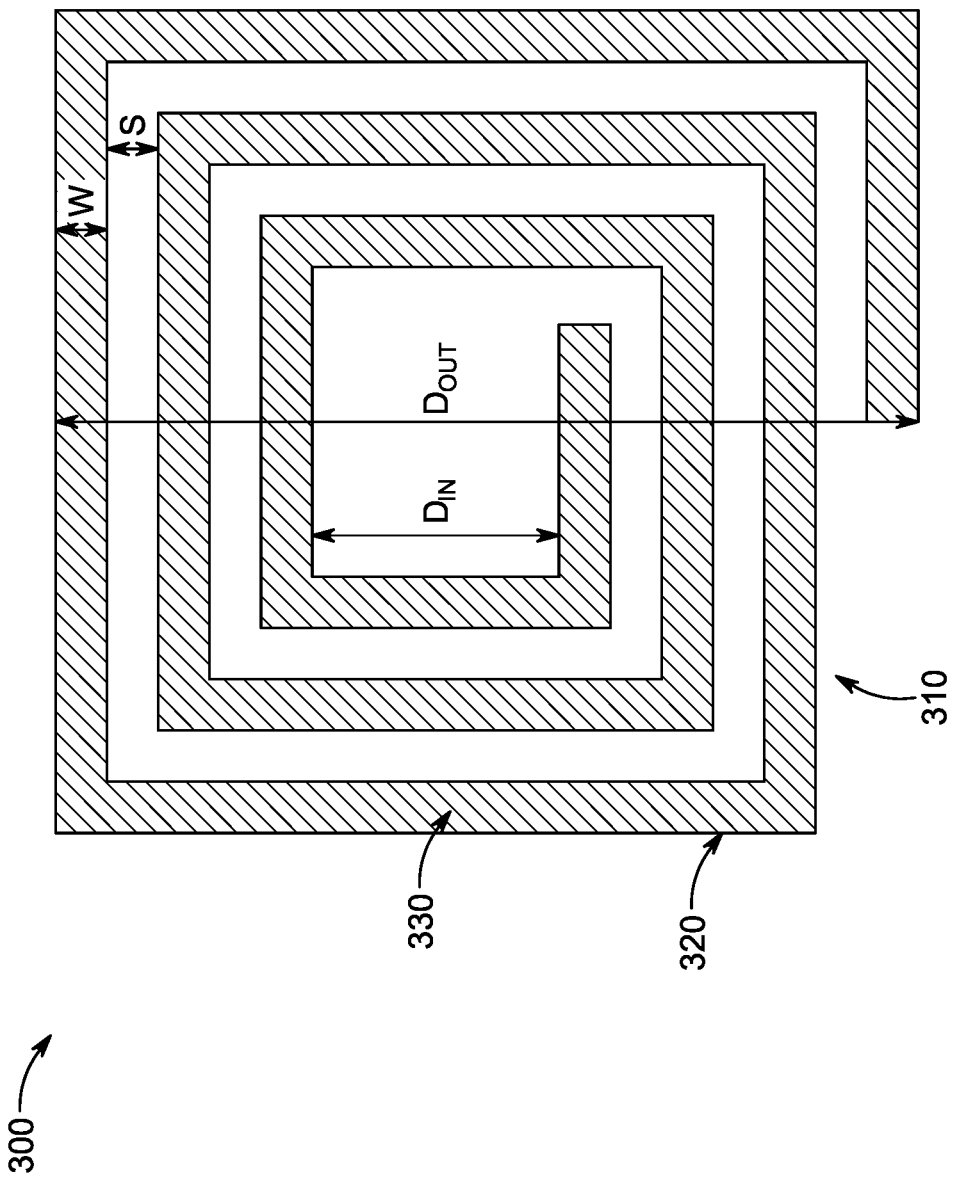
FIG. 3 is a diagram illustrating an embodiment of a sensor coil formed by the method of manufacturing described in relation to FIG. 1 according to the subject matter provided herein.

FIG. 3 is a diagram illustrating an embodiment of a sensor coil formed by the method of manufacturing described in relation to FIG. 1 according to the subject matter provided herein. As shown in FIG. 3, a sensor 300 can include a sensor coil 310. The sensor coil 310 can include a dielectric material 320 and a conductive material 330 formed atop the dielectric material 330. Although the sensor coil 310 shown in FIG. 3 is illustrated in a square-shaped pattern of concentric features, a variety of non-limiting pattern shapes can be implemented. For example, the sensor coil 310 can include a cross-shaped pattern of concentric features, an elliptically-shaped pattern of concentric features, a circular-shaped pattern of concentric features, or a matrix-shaped pattern including a plurality of horizontal features and a plurality of vertical features.

Figure 4C:
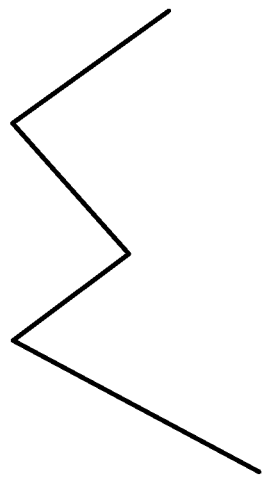
FIGS. 4A-4C are diagrams illustrating substrate profiles matching cross-sectional shaped of objects to be inspected using a sensor coil formed by the method of manufacturing described in relation to FIG. 1 according to the subject matter provided herein.
Figure 4B:
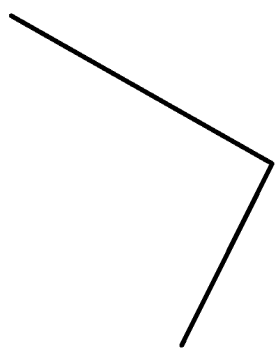
Figure 4A:
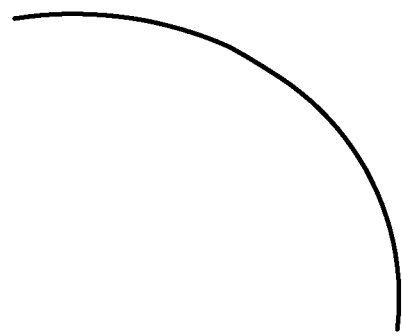

FIGS. 4A-4C are diagrams illustrating substrate profiles matching cross-sectional shaped of objects to be inspected using a sensor coil formed by the method of manufacturing described in relation to FIG. 1 according to the subject matter provided herein. As shown in FIG. 4A, the substrate used to form the sensor coil described herein can have a curved profile, which can correspond to an object having a curved cross-sectional shape such as an interior wall surface of a pipe. As shown in FIG. 4B, the substrate can have an angled profile. As shown in FIG. 4C, the substrate can have irregularly-shaped geometric profile. The substrate can also include a flat or planar profile.

FIG. 5 is a table illustrating design parameters of the sensor coil formed by the method of manufacturing described in relation to FIG. 1 according to the subject matter provided herein. The table 500 can correspond to the sensor coil 310 shown in FIG. 3. Table 500 illustrates a number of non-limiting design parameters of the sensor coil 310. For example, the width (W) of the traces can be measured in mils. Each mil is equivalent to 0.0254 mm. For example, the width, W, can be between 2-15 mil. The space between traces (S) can be measured in mils. The space, S, can be between 1-10 mil. The outer diameter or dimension (Dout) of the sensor coil can be between 200-4000 mil. The sensor coil can be sintered at a temperature between 20-40 degrees Celsius. The voltage used to sputter the first layer of the conductive material can be between 200-600 V. The spacing between adjacent layers of the conductive material can be between 2-8 mil. In some embodiments, the dielectric material or an insulative material can be formed between adjacent layers of the conductive material.

The improved method of manufacturing described herein address the technical problem of forming non-planar sensor coils in an economically scalable manner and increasing the measurement sensitivity by forming an improved sensor/object interface for inspecting or sensing non-planar object surfaces, such as curved surfaces. Using additive manufacturing techniques described herein, the sensor coil can provide exemplary technical effects of increased sensitivity and measurement quality compared to planar or laminate manufacturing methods. The sensor coil and method of manufacturing described herein can improve the usable surface area of the sensor to ensure a maximal amount of contact with an object being sensed. This can increase the accuracy of the sensor and broaden its usage over a larger number of applications than existing sensor coils or sensors which can be formed using PCB or non-additive manufacturing techniques. In addition, the sensor coil and method of manufacture described herein can enable rapid prototyping of new sensor designs without incurring excessive inventories or parts in advance of a final design.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A method of manufacturing comprising:
   determining a cross-sectional shape of an object to be inspected using a sensor configured with a sensor coil;
   providing a substrate having a profile matching the cross-sectional shape of the object;
   applying a dielectric material to the substrate, the dielectric material applied in a pattern matching a shape of the sensor coil;
   forming a first layer of a first material on the dielectric material, the first layer formed by sputtering particles of the first material on the dielectric material in the pattern matching the shape of the sensor coil;
   forming additional layers of the first material atop the first layer by iteratively depositing the additional layers of the first material in the pattern matching the shape of the sensor coil via an additive manufacturing technique.

2. The method of claim 1, wherein the dielectric material is applied as a solution containing a plurality of dielectric material particles suspended in a carrier fluid sprayed onto the substrate.

3. The method of claim 1, wherein the dielectric material comprises a ceramic material, a polyimide material, a copper material, or a glass-reinforced epoxy laminate material.

4. The method of claim 1, wherein applying the dielectric material to the substrate further comprises sintering the dielectric material at a first temperature and a first pressure.

5. The method of claim 4, wherein the first temperature and/or the first pressure are selected based on the dielectric material.

6. The method of claim 4, wherein the sintering removes the carrier fluid from the substrate.

7. The method of claim 1, wherein the additive manufacturing technique comprises providing a feedstock of the additional amounts of the first material, the feedstock including a wire or a powder.

8. The method of claim 1, wherein the additive manufacturing technique comprises at least one of direct laser melting, direct metal laser melting, laser chemical vapor deposition, or laser physical vapor deposition.

9. The method of claim 1, wherein the profile of the substrate comprises a curved profile, a flat profile, an angled profile, or an irregularly-shaped geometric profile.

10. The method of claim 1, wherein the first material comprises silver.

11. The method of claim 1, wherein the pattern comprises a concentric-shaped pattern, a cross-shaped pattern, an elliptically-shaped pattern, or a matrix-shaped pattern including a plurality of horizontal features and a plurality of vertical features.

12. The method of claim 1, wherein the dielectric material is applied in one or more layers.

13. The method of claim 12, wherein a thickness of the one more layers of the dielectric material is between 2 microns and 3 microns.

14. The method of claim 1, wherein the first layer and/or the additional layers are formed to be between 3 microns and 4 microns thick.

15. A sensor comprising:
   a substrate having a profile configured to match a cross-sectional shape of an object to be inspected;
   a sensor coil formed on the substrate in a coil pattern;
   a first layer of a dielectric material formed on the substrate in a pattern matching the coil pattern;
   a first layer of a first material atop the first layer of the dielectric material, the first layer of the first material formed in the coil pattern by sputtering particles of the first material onto the first layer of the dielectric material;
   a plurality of additional layers of the first material atop the first layer of the first material, the plurality of additional layers of the first material formed in the coil pattern by iteratively depositing the additional layers of the first material via an additive manufacturing technique.

16. The sensor of claim 15, wherein the sensor comprises an electromagnetic acoustic transceiver sensor or an eddy current sensor.

17. The sensor of claim 15, wherein the profile comprises a curved profile, a flat profile, an angled profile, or an irregularly-shaped geometric profile.

18. The sensor of claim 15, wherein the coil pattern comprises a concentric-shaped pattern, a cross-shaped pattern, an elliptically-shaped pattern, or a matrix-shaped pattern including a plurality of horizontal features and a plurality of vertical features.

19. The sensor of claim 15, wherein the dielectric material comprises a ceramic material, a polyimide material, a copper material, or a glass-reinforced epoxy laminate material.

20. The sensor of claim 15, wherein the first material comprise silver.

* * * * *